(12) United States Patent
Suh

(10) Patent No.: US 12,423,565 B2
(45) Date of Patent: Sep. 23, 2025

(54) MULTICHIP SYSTEM AND DATA PROCESSING METHOD ADAPTED TO THE SAME FOR IMPLEMENTING NEURAL NETWORK APPLICATION

(71) Applicant: GENESYS LOGIC, INC., New Taipei (CN)

(72) Inventor: Woon Sik Suh, New Taipei (CN)

( * ) Notice: Subject to any disclaimer, the term of this patent is extended or adjusted under 35 U.S.C. 154(b) by 1180 days.

(21) Appl. No.: 17/290,761

(22) PCT Filed: Apr. 10, 2019

(86) PCT No.: PCT/CN2019/082128
§ 371 (c)(1),
(2) Date: May 2, 2021

(87) PCT Pub. No.: WO2020/093654
PCT Pub. Date: May 14, 2020

(65) Prior Publication Data
US 2022/0004856 A1 Jan. 6, 2022

Related U.S. Application Data

(60) Provisional application No. 62/756,095, filed on Nov. 6, 2018.

(51) Int. Cl.
*G06N 3/063* (2023.01)
*G06F 1/03* (2006.01)
(Continued)

(52) U.S. Cl.
CPC ............... *G06N 3/063* (2013.01); *G06F 1/03* (2013.01); *G06F 7/50* (2013.01); *G06F 7/523* (2013.01);
(Continued)

(58) Field of Classification Search
None
See application file for complete search history.

(56) References Cited

U.S. PATENT DOCUMENTS

2018/0181881 A1  6/2018  Du et al.
2019/0065953 A1  2/2019  Li et al.
(Continued)

FOREIGN PATENT DOCUMENTS

CN   105844330 A    8/2016
TW   201824098 A    7/2018
WO   2017185248 A1  11/2017

*Primary Examiner* — Charles J Choi

(57) ABSTRACT

A data processing method, a multichip system, and a non-transitory computer-readable medium for implementing a neuron network application are provided. The data processing method includes: allocating corresponding chips to process a corresponding part of a first stage data and a corresponding part of a second stage data; transmitting, by a first chip, a first part of the first stage data to a second chip through a channel; transmitting, by the second chip, a second part of the first stage data to the first chip through the channel; computing, by the first chip, the first stage data with a first part of weight values to obtain a first result, and computing, by the second chip, the first stage data with a second part of weight values to obtain a second result, where the first result and the second result are one of the second stage data.

15 Claims, 6 Drawing Sheets

(51) Int. Cl.
| | |
|---|---|
| *G06F 7/50* | (2006.01) |
| *G06F 7/523* | (2006.01) |
| *G06F 7/53* | (2006.01) |
| *G06F 7/544* | (2006.01) |
| *G06F 9/54* | (2006.01) |
| *G06N 3/048* | (2023.01) |
| *G06N 3/08* | (2023.01) |

(52) U.S. Cl.
CPC .............. *G06F 7/53* (2013.01); *G06F 7/5443* (2013.01); *G06F 9/54* (2013.01); *G06N 3/048* (2023.01); *G06N 3/08* (2013.01)

(56) References Cited

U.S. PATENT DOCUMENTS

| | | | |
|---|---|---|---|
| 2019/0294959 A1* | 9/2019 | Vantrease | G06N 3/063 |
| 2020/0125932 A1* | 4/2020 | Khwa | G06N 3/08 |

\* cited by examiner

MULTICHIP SYSTEM AND DATA PROCESSING METHOD ADAPTED TO THE SAME FOR IMPLEMENTING NEURAL NETWORK APPLICATION

FIELD OF DISCLOSURE

The present disclosure relates to the field of a multichip system, and more particularly to a multichip system, a data processing method adapted to the same, and a non-transitory computer-readable medium for implementing neural network application.

BACKGROUND

Artificial neural networks refer to a computational modeled after biological brains. Within a neural network, nodes referred to as neurons may be interconnected and operate collectively to process input data. Examples of different types of neural networks include, but are not limited to, Convolutional Neural Networks, Recurrent Neural Networks, Deep Belief Networks, Restricted Boltzman Machines, etc. In a feedforward neural network, the neurons of the neural network have links to other neurons. The links only extend in one direction, i.e., the forward direction, through the neural network.

A neural network may be utilized to extract "feature values" from complex input data. The neural network may include a plurality of layers. Each layer would receive input data and generate output data by processing the input data of the layer. The output data may be a feature value map of the input data that the neural network generates by convolving an input image or a feature value map with convolution kernels. In implementations of a convolutional neural network (CNN) acceleration chip, since it is not possible to specify number and amount of the acceleration resources, the possibility of parallelization at the chip level is one of the most important parts. Synchronization of accelerating elements in each chip and sharing of data are always the key issues.

Accordingly, it is necessary to provide a multichip system and a data processing method to solve the technical problems in the prior art.

SUMMARY OF THE DISCLOSURE

In order to solve technical problems mentioned above, an object of the present disclosure is to provide a multichip system, a data processing method, and a non-transitory computer-readable medium to enable chip-level parallelization more effectively.

In order to achieve the object described above, the present disclosure provides a data processing method adapted to a multichip system for implementing a neural network application, where the multichip system includes a channel, a first chip and a second chip connecting with the channel, where the neural network application includes a first stage data, a second stage data, a third stage data, and a plurality of weight values, the data processing method includes: allocating the first chip to process a first part of the first stage data, a first part of the second stage data, and a first part of the third stage data, and allocating the second chip to process a second part of the first stage data, a second part of the second stage data, and a second part of the third stage data; acquiring, by the first chip, a first part of the plurality of weight values corresponding the second stage data; acquiring, by the second chip, a second part of the plurality of weight values corresponding the second stage data; acquiring, by the first chip, the first part of the first stage data; transmitting, by the first chip, the first part of the first stage data to the second chip through the channel; receiving, by the second chip, the first part of the first stage data; acquiring, by the second chip, the second part of the first stage data; transmitting, by the second chip, the second part of the first stage data to the first chip through the channel; receiving, by the first chip, the second part of the first stage data; computing, by the first chip, the first stage data with the first part of the plurality of weight values to obtain a first result, where the first result is one of the second stage data; and computing, by the second chip, the first stage data with the second part of the plurality of weight values to obtain a second result, where the second result is one of the second stage data.

In one preferred embodiment of the present disclosure, after obtaining the first result and the second result, the data processing method further includes: acquiring, by the first chip, a third part of the plurality of weight values corresponding the second stage data; acquiring, by the second chip, a fourth part of the plurality of weight values corresponding the second stage data; acquiring, by the first chip, the first part of the first stage data; transmitting, by the first chip, the first part of the first stage data to the second chip through the channel; receiving, by the second chip, the first part of the first stage data; acquiring, by the second chip, the second part of the first stage data; transmitting, by the second chip, the second part of the first stage data to the first chip through the channel; receiving, by the first chip, the second part of the first stage data; computing, by the first chip, the first stage data with the third part of the plurality of weight values to obtain a third result, where the third result is one of the second stage data; and computing, by the second chip, the first stage data with the fourth part of the plurality of weight values to obtain a fourth result, where the fourth result is one of the second stage data.

In one preferred embodiment of the present disclosure, after obtaining the first result, the second result, the third result, and the fourth result, the data processing method further includes: sequentially assigning the first result, the third result, the second result, and the fourth result as input data of the second stage data.

In one preferred embodiment of the present disclosure, the multichip system further includes a first memory and a second memory, the first memory is connected with the first chip, the second memory is connected with the second chip; the first memory includes a first zone and a second zone, and the second memory includes a third zone and a fourth zone; and the first part of the first stage data is stored in the first zone of the first memory and the first part of the second stage data is stored in the second zone of the first memory, and the second part of the first stage data is stored in the third zone of the second memory and the second part of the second stage data is stored in the fourth zone of the second memory.

In one preferred embodiment of the present disclosure, the data processing method further includes: erasing the first part of the first stage data from the first memory and erasing the second part of the first stage data from the second memory; and converting the second zone of the first memory and the fourth zone of the second memory into input data storage area.

In one preferred embodiment of the present disclosure, the multichip system further includes a memory connected with the first and second chips and a plurality of transmitting lines configured to connect he first and second chips;

the memory includes a first zone and a second zone; and the first stage data are stored in the first zone of the memory and the second stage data are stored in the second zone of the memory.

The present disclosure also provides a multichip system for implementing a neural network application, where the neural network application includes a first stage data, a second stage data, a third stage data, and a plurality of weight values, the multichip system includes: a data channel; a first chip and a second chip connecting with the data channel; a storage; a processor, where computerized codes of the multichip system are stored in the storage and configured to be executed by the processor to perform a data processing method, the data processing method includes: allocating the first chip to process a first part of the first stage data, a first part of the second stage data, and a first part of the third stage data, and allocating the second chip to process a second part of the first stage data, a second part of the second stage data, and a second part of the third stage data; acquiring, by the first chip, a first part of the plurality of weight values corresponding the second stage data; acquiring, by the second chip, a second part of the plurality of weight values corresponding the second stage data; acquiring, by the first chip, the first part of the first stage data; transmitting, by the first chip, the first part of the first stage data to the second chip through the data channel; receiving, by the second chip, the first part of the first stage data; acquiring, by the second chip, the second part of the first stage data; transmitting, by the second chip, the second part of the first stage data to the first chip through the data channel; receiving, by the first chip, the second part of the first stage data; computing, by the first chip, the first stage data with the first part of the plurality of weight values to obtain a first result, where the first result is one of the second stage data; and computing, by the second chip, the first stage data with the second part of the plurality of weight values to obtain a second result, where the second result is one of the second stage data.

In one preferred embodiment of the present disclosure, the data processing method further includes: acquiring, by the first chip, a third part of the plurality of weight values corresponding the second stage data; acquiring, by the second chip, a fourth part of the plurality of weight values corresponding the second stage data; acquiring, by the first chip, the first part of the first stage data; transmitting, by the first chip, the first part of the first stage data to the second chip through the channel; receiving, by the second chip, the first part of the first stage data; acquiring, by the second chip, the second part of the first stage data; transmitting, by the second chip, the second part of the first stage data to the first chip through the channel; receiving, by the first chip, the second part of the first stage data; computing, by the first chip, the first stage data with the third part of the plurality of weight values to obtain a third result, where the third result is one of the second stage data; and computing, by the second chip, the first stage data with the fourth part of the plurality of weight values to obtain a fourth result, where the fourth result is one of the second stage data.

In one preferred embodiment of the present disclosure, the data processing method further includes: sequentially assigning the first result, the third result, the second result, and the fourth result as input data of the second stage data.

In one preferred embodiment of the present disclosure, the multichip system further includes a first memory and a second memory, the first memory is connected with the first chip, the second memory is connected with the second chip;

the first memory includes a first zone and a second zone, and the second memory includes a third zone and a fourth zone; and the first part of the first stage data is stored in the first zone of the first memory and the first part of the second stage data is stored in the second zone of the first memory, and the second part of the first stage data is stored in the third zone of the second memory and the second part of the second stage data is stored in the fourth zone of the second memory.

In one preferred embodiment of the present disclosure, the data processing method further includes: erasing the first part of the first stage data from the first memory and erasing the second part of the first stage data from the second memory; and converting the second zone of the first memory and the fourth zone of the second memory into input data storage area.

In one preferred embodiment of the present disclosure, the multichip system further includes a memory connected with the first and second chips and a plurality of transmitting lines configured to connect he first and second chips;

the memory includes a first zone and a second zone;

the first stage data are stored in the first zone of the memory and the second stage data are stored in the second zone of the memory; and each of the first and second chips acquires the first stage data from the memory through at least one of the transmitting lines.

The present disclosure also provides a non-transitory computer-readable medium for implementing a neuron network application in a multichip system, the non-transitory computer-readable medium having program codes recorded thereon, the program codes being executed by a processor and including:

A, setting-up input neurons and output neurons of the neural network, where each of the output neurons is connected to the input neurons via synapses for weighting outputs from the input neurons depending on weight values;

B, waiting first stage data corresponding to the input neurons over a channel;

C, computing partial first stage data with corresponding weight values;

D, simultaneously computing second stage data corresponding to the output neurons;

E, determining, whether to compute all of the weight values, if yes, proceed to F, if not, back to B;

F, keeping the second stage data on a memory;

G, setting-up the second stage data for the output neurons; and

H, determining, whether all assigned output neurons are completed or not, if yes, switching to a next layer application, if no, calling a new channel task and back to A.

In one preferred embodiment of the present disclosure, the new channel task includes: I, loading the first stage data form the memory; J, broadcasting with the first stage data through the channel; K, determining, whether the first stage data are completely broadcasted, if yes, proceed to L, if not, back to J; and L, determining, whether to compute all of the first stage data, if yes, the new channel task is end, if not, back to I.

In one preferred embodiment of the present disclosure, the switching of the next layer application includes: M, setting-up input points of the memory as output points; and N, setting-up output points of the memory into input points.

In comparison to prior art, the present disclosure provides a multichip system, which is capable of parallel operation. In order to improve the performance of a machine learning accelerating chip, the present disclosure provides a broadcasting channel for multichip system function. It is a structural design idea based on the fulfillment of the market demand of the form having the function. In order to realize this, in the present disclosure, the input feature value of each chip is partially transmitted and shared, and it is possible to calculate the troop by using it in other chips at the same time, and the calculated result will be finally output neuron value, and it acts as the input data of the next layer again. This allows us to achieve high performance and low cost system with the multichip system to meet market demands.

DETAILED DESCRIPTION

The structure and the technical means adopted by the present disclosure to achieve the above and other objects can be best understood by referring to the following detailed description of the preferred embodiments and the accompanying drawings.

Figure 1:
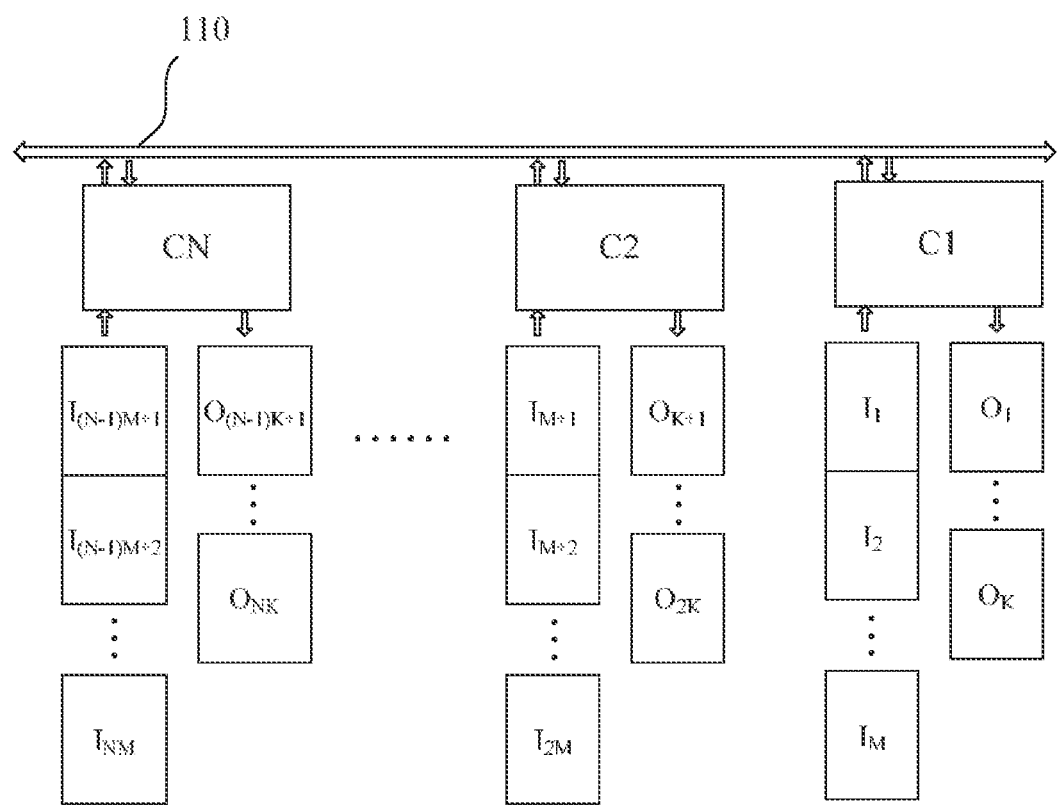
FIG. 1 is a simplified block diagram showing a data processing procedure according to the present disclosure.

Referring to FIG. 1, which shows a simplified block diagram showing a data processing procedure according to the present disclosure. The data processing procedure adapted to a multichip system for implementing neural network application. The multichip system at least includes a broadcasting channel 110 and a plurality of chips C1-CN connecting with the broadcasting channel 110, where each chip C1-CN has a built-in counter to show that it is in broadcast order by itself. As shown in FIG. 1, each of chips C1-CN allocates a plurality of input feature values. For example, a first chip C1 allocates input feature values $I_1$, $I_2$, $I_M$, etc. In the data processing procedure, each of the chips C1-CN transmits input feature values allocating it to other chips through the broadcasting channel 110. Then, the chips C1-CN process and parallelly compute output feature values, such as output feature values $O_1$, $O_2$, $O_M$, according to received input feature values. The specific implementations of multichip system and data processing method adapted to the same for implementing neural network application of the present disclosure will be described in detail hereinbelow.

Figure 2:
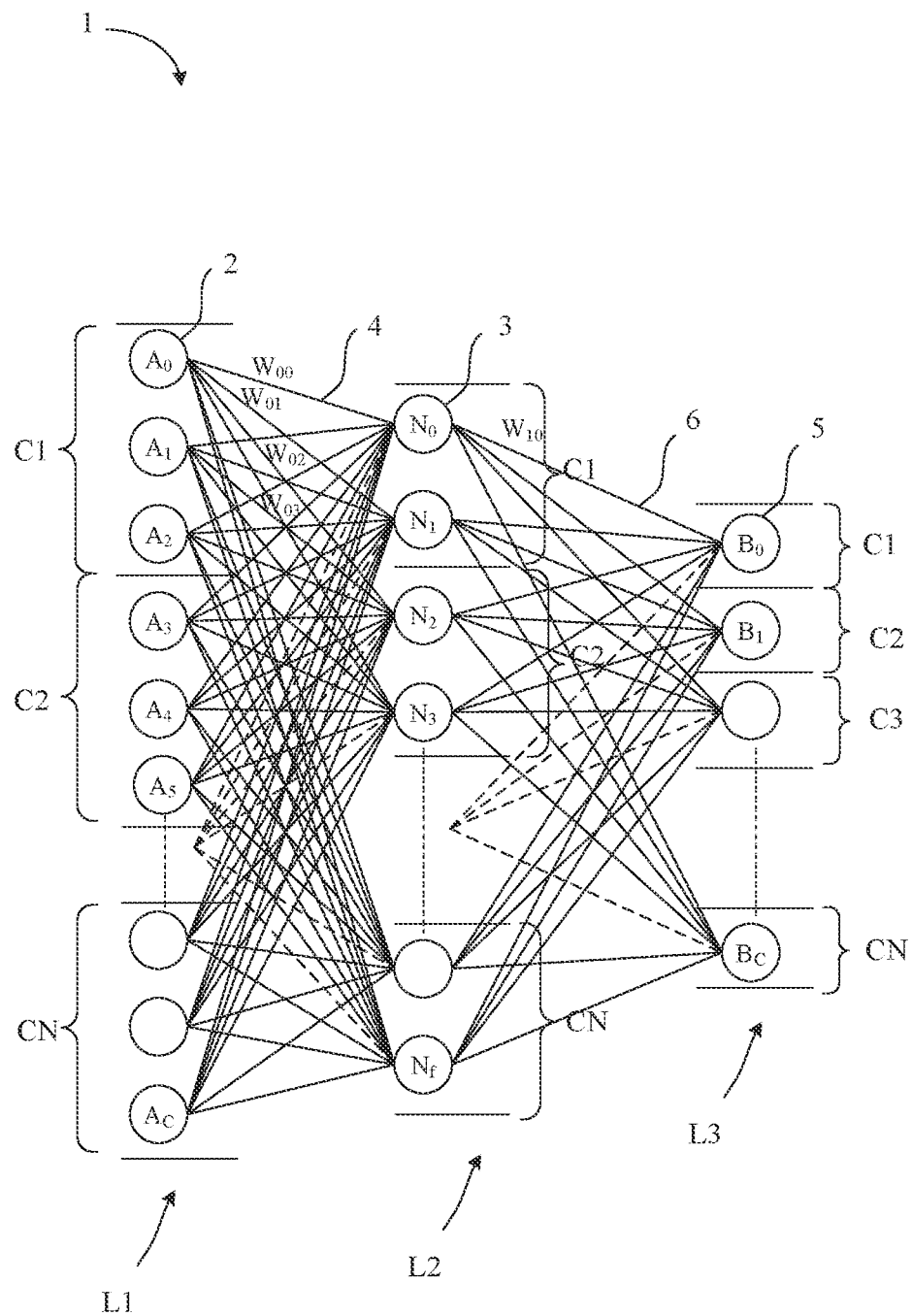
FIG. 2 shows a simplified block diagram of a neural network according to a first preferred embodiment of the present disclosure.

Referring to FIG. 2, which shows a simplified block diagram of a neural network 1 according to a first preferred embodiment of the present disclosure. The neural network 1 includes a plurality of layers (including a first layer L1, a second layer L2, and a third layer L3), a plurality of neurons 2 in the first layer L1, a plurality of neurons 3 in the second layer L2, and a plurality of neurons 5 in the third layer L3. An input map creates a set of values for the first layer L1. The first layer L1 may be generated by direct mapping of a pixel of the input map to a particular neuron in the first layer L1, such that the neurons 2 associated with one of first stage data (such as $A_0$, $A_1$, $A_2$, $A_3$, $A_4$, $A_C$, and so on) depending on whether the pixel exhibits a particular attribute. Depending on the vagaries of the neural network and the problem it is created to solve, each layer of the neural network 1 may have differing numbers of neurons, and these may or may not be related to particular qualities of the input feature values (i.e., the first stage data $A_0$-$A_C$).

As shown in FIG. 2, if the first layer L1 is an input layer and the second layer L2 is an output layer of the neural network 1, the neurons 2 serve as input neurons, and the neurons 3 serve as output neurons. The input neurons 2 in the first layer L1 are connected to the output neurons 3 in the second layer L2. In the neural network 1, each of the neurons in a particular layer is connected to neurons in the next layer by a plurality of synapses 4 and synapses 6 for weight value outputs from the input neurons depending on synapse weight values, such as $W_{00}$, $W_{01}$, etc. The output neuron 3 in the second layer L2, consequently, receives the first stage data $A_0$-$A_C$ from each of the input neurons 2 in the first layer L1. The first stage data $A_0$-$A_C$ are then summed and this sum compared to a bias, and the value can be used as subsequent input feature values (i.e., second stage data $N_0$-$N_f$) to neurons in the next layer of neurons. This computation continues through the various layers of the neural network 1, until it reaches a final layer. For example, if the third layer L3 is the final layer, the second layer L2 is an input layer and the third layer L3 is an output layer of the neural network 1. The neurons 3 serve as input neurons, and the neurons 5 serve as output neurons. The output neuron 5 in the third layer L3, consequently, receives the second stage data $N_0$-$N_f$ from each of the input neurons 3 in the second layer L2. The second stage data $N_0$-$N_f$ are then summed and this sum compared to a bias, and the obtained values are third stage data $B_0$-$B_c$.

Figure 3:
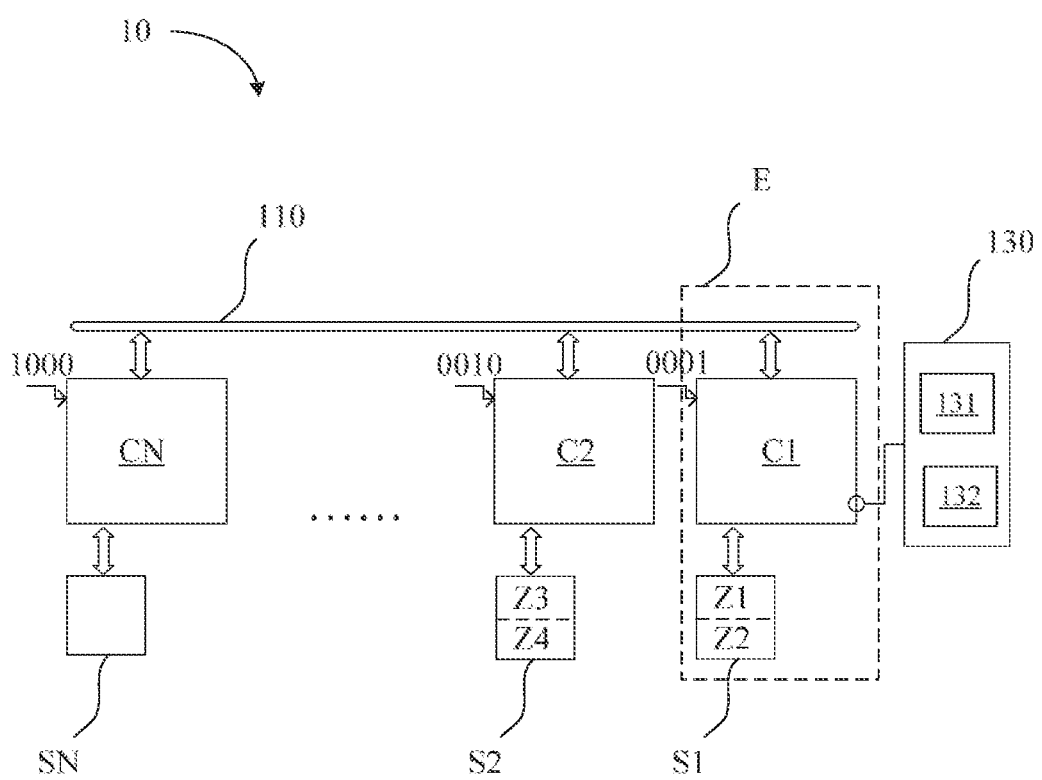
FIG. 3 shows a multichip system for implementing neural network application of FIG. 2.

Referring to FIG. 3, which shows a multichip system 10 for implementing neural network application of FIG. 2. The neural network 1 is implemented by the multichip system 10, and the multichip system 10 includes a broadcasting channel 110, a plurality of chips (e.g., a first chip C1, a second chip C2, an Nth chip CN, etc.), a controller 130, and a plurality of memories S1-SN. The broadcasting channel 110 is connected with the plurality of chips C1-CN. The broadcasting channel 110 is utilized to transmit data from chips to the other chips. In one embodiment, the chips C1-CN may be accelerating chips. Each of chips C1-CN is connected with one of the memories S1-SN. The unique index, such as 0001, 0010, 0100, 1000, of all the chips is physically assigned.

In the present disclosure, one of the chips C1-CN assigned to a master (i.e., operating in a master mode) by a predefined protocol occupies the broadcasting channel 110 and performs data bus operation. All the remaining chips operate in a slave mode and receive the data. Specifically, when the first stage data $A_0$-$A_C$ are sequentially transmitted through the broadcasting channel 110, an operating protocol of the broadcasting channel 110 causes one of the chips to become the master and the other chips to operate as slaves. The master mode is an operation mode for a chip to maintain control of the computing chips. In one implementation, when operating in the master mode, the chip can further control and manage the other chips operating in the slave mode. The slave mode is an operation mode for one of the chips to allow the other chips, operating in master mode, to control and manage it.

Figure 4:
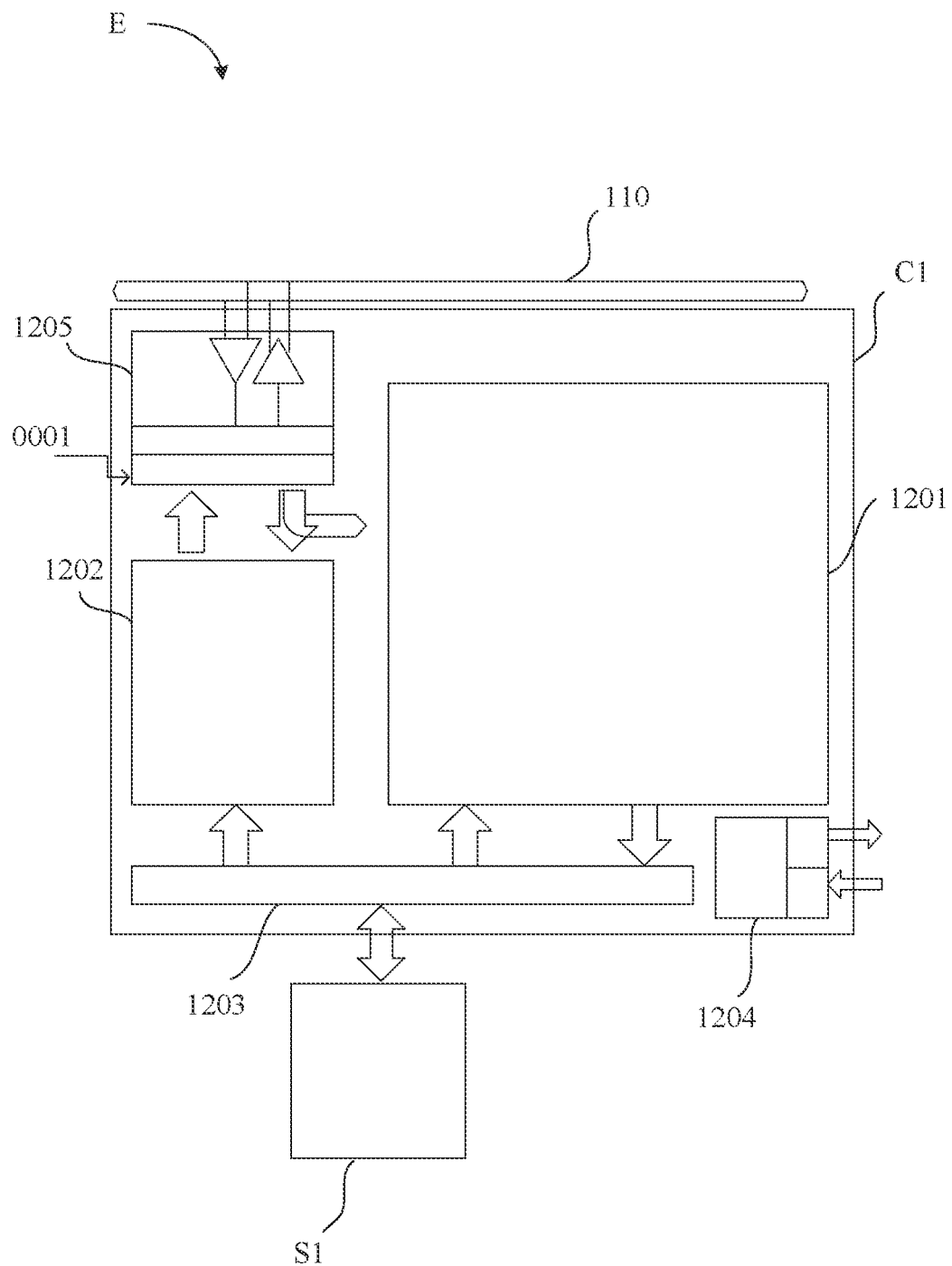
FIG. 4 shows a schematic diagram of a specific structure of E portion of FIG. 3.

Referring to FIG. 4, which shows a schematic diagram of a specific structure of E portion of FIG. 3. The first chip C1 includes a computing array 1201, a buffer 1202, a storage controller 1203, a communication channel 1204, and a physical interface 1205. Preferably, a multipoint low voltage differential signaling (LVDS) physical channel is applied to the broadcasting channel 110 and a standardized physical channel, such as two universal serial bus (USB) or mobile industry processor interface (MIPI), are applied to the communication channel 1204. If the first chip C1 is operated in a master mode, the other chips C2-CN operate in the slave mode. Moreover, each of the other chips C2-CN includes similar elements as the first chip C1.

As shown in FIG. 2 and FIG. 3, the controller 130 of the multichip system 10 includes a storage 131 and a processor 132. Computerized codes of the multichip system 10 are stored in the storage 131 configured to be executed by the processor 132 to perform a data processing method. The data processing method includes steps as follows. Firstly, one or more different input neurons 2, output neurons 3, and neurons 5 of the neural network 1 are allocated to each of the chips C1-CN. That is, each of the input neurons 2, neurons 3, and neurons 5 is occupied by one of chips C1-CN. Also, the first stage data $A_0$-$A_C$ associated with the input neurons 2 of the neural network 1 are stored in the corresponding memories S1-SN of the multichip system 10. Specifically, a first to third input neurons 2 of the neural network 1 are occupied by the first chip C1, and the first to third input neurons 2 are respectively associated with a first part of the first stage data $A_0$-$A_2$. That is, the first chip C1 is allocated to process a first part of the first stage data $A_0$-$A_2$, a first part of the second stage data $N_0$ and $N_1$, and a first part of the third stage data $B_0$. Similarly, the second chip C2 is allocated to process a second part of the first stage data $A_3$-$A_5$, a second part of the second stage data $N_2$ and so on, and a second part of the third stage data Bi.

As shown in FIG. 2 and FIG. 3, the first part of the first stage data $A_0$-$A_2$ are stored in a first memory S1, and the second part of the first stage data $A_3$-$A_5$ are stored in the second memory S2. After the neurons 2, the neurons 3, and the neurons 5 of the neural network 1 are allocated to each of the chips C1-CN, each of the chips C1-CN acquires a corresponding part of the weight values corresponding to the second stage data $N_0$-$N_f$. For example, the first chip C1 acquires a first part of the weight values (e.g., $W_{00}$ and so on) corresponding to the second stage data $N_0$-$N_f$, and the second chip C2 acquires a second part of the weight values (e.g., $W_{02}$ and so on) corresponding to the second stage data $N_0$-$N_f$.

Then, each of the chips C1-CN sequentially acquires and transmits the corresponding part of the first stage data $A_0$-$A_c$ to other chips through the broadcasting channel 110. After a master chip sequentially transmits all the data of it, the next chip becomes the master and performs the same operation, and the remaining chips become the slave for receiving the data. That is, once all corresponding part of the first stage data of the master chip are shared to other chips, the next chip having another corresponding part of the first stage data becomes the master chip until its first stage data is exhausted. For example, if the first chip C1 is the master chip, the first chip C1 acquires the first part of the first stage data $A_0$-$A_2$, and transmits the first part of the first stage data $A_0$-$A_2$ to the second chip C2 through the broadcasting channel 110, such that the second chip C2 receives the first part of the first stage data $A_0$-$A_2$. Similarly, the first chip C1 sequentially transmits the first part of the first stage data $A_0$-$A_2$ to other chips C3-CN, such that the other chips C3-CN sequentially receive the first part of the first stage data $A_0$-$A_2$. After the first part of the first stage data $A_0$-$A_2$ of the first chip C1 are shared to other chips C2-CN, the next chip, i.e., the second chip C2, having the second part of the first stage data $A_3$-$A_5$ becomes the master chip. Then, the second chip C2 acquires the second part of the first stage data $A_3$-$A_5$, and transmits the second part of the first stage data $A_3$-$A_5$ to the first chip C1 through the broadcasting channel 110, such that the first chip C1 receives the second part of the first stage data $A_3$-$A_5$. Then, the second chip C2 sequentially transmits the second part of the first stage data $A_3$-$A_5$ to other chips C3-CN, such that the other chips C3-CN sequentially receive the second part of the first stage data $A_3$-$A_5$ to the first chip C1 through the broadcasting channel 110, such that the first chip C1 receives the second part of the first stage data $A_3$-$A_5$. Then, the second chip C2 sequentially transmits the second part of the first stage data $A_3$-$A_5$ to other chips C3-CN, such that the other chips C3-CN sequentially receive the second part of the first stage data $A_3$-$A_5$. Therefore, the first chip C11 acquire all the first stage data $A_0$-$A_c$ first, followed by the second chip C2, and so on.

After one of the chips C1-CN receives one of the first stage data $A_0$-$A_c$, the corresponding chip computes the first stage data $A_0$-$A_c$ with a corresponding synapse weight value to generate a weight value output. That is, the plurality of chips C1-CN parallelly compute the first stage data $A_0$-$A_C$ for a total of weight value outputs from the input neurons in accordance with its output function. For example, the first chip C1 computes the first stage data $A_0$-$A_c$ with the first part of the weight values (e.g., $W_{00}$ and so on) by the computing array 1201 to obtain a first result $N_0$, where the first result No is one of the second stage data $N_0$-$N_f$. Then, the second chip C2 computes the first stage data $A_0$-$A_C$ with the second part of the weight values (e.g., $W_{02}$ and so on) to obtain a second result $N_2$, where the second result $N_2$ is one of the second stage data $N_0$-$N_f$.

The chips C1-CN repeatedly execute above acquisition and sequentially transmission until all of the chips C1-CN transmit the first stage data $A_0$-$A_c$ to each other through the broadcasting channel 110, and thus their second stage data $N_0$-$N_f$ are completed. Specifically, after the first result No and the second result $N_2$ of the second stage data $N_0$-$N_f$ are obtained, the first chip C1 acquires a third part of the weight values (e.g., $W_{01}$ and so on) corresponding the second stage data $N_0$-$N_f$, and the second chip C2 acquires a fourth part of the weight values (e.g., $W_{03}$ and so on) corresponding the second stage data $N_0$-$N_f$. Then, each of the chips C1-CN sequentially acquires and transmits the corresponding part of the first stage data $A_0$-$A_c$ to other chips through the broadcasting channel 110 again. After a master chip sequentially transmits all the data of it, the next chip becomes the master and performs the same operation, and the remaining chips become the slave for receiving the data. That is, once all corresponding part of the first stage data of the master chip are shared to other chips, the next chip having another corresponding part of the first stage data becomes the master chip until its first stage data is exhausted. For example, if the first chip C1 is the master chip, the first chip C1 acquires the first part of the first stage data $A_0$-$A_2$, and transmits the first part of the first stage data $A_0$-$A_2$ to the second chip C2 through the broadcasting channel 110, such that the second chip C2 receives the first part of the first stage data $A_0$-$A_2$. Similarly, the first chip C1 sequentially transmits the first part of the first stage data $A_0$-$A_2$ to other chips C3-CN, such that the other chips C3-CN sequentially receive the first part of the first stage data $A_0$-$A_2$. After the first part of the first stage data $A_0$-$A_2$ of the first chip C1 are shared to other chips C2-CN, the next chip, i.e., the second chip C2, having the second part of the first stage data $A_3$-$A_5$ becomes the master chip. Then, the second chip C2 acquires the second part of the first stage data $A_3$-$A_5$, and transmits the second part of the first stage data $A_3$-$A_5$ to the first chip C1 through the broadcasting channel 110, such that the first chip C1 receives the second part of the first stage data $A_3$-$A_5$. Then, the second chip C2 sequentially transmits the second part of the first stage data $A_3$-$A_5$ to other chips C3-CN, such that the other chips C3-CN sequentially receive the second part of the first stage data $A_3$-$A_5$. Therefore, the first chip C11 acquire all the first stage data $A_0$-$A_C$ first, followed by the second chip C2, and so on.

After one of the chips C1-CN receives one of the first stage data $A_0$-$A_c$, the corresponding chip computes the first stage data $A_0$-$A_c$ with a corresponding synapse weight value to generate a weight value output. That is, the plurality of chips C1-CN parallelly compute the first stage data $A_0$-$A_C$ for a total of weight value outputs from the input neurons in accordance with its output function. For example, the first chip C1 computes the first stage data $A_0$-$A_c$ with the third part of the weight values (e.g., $W_{01}$ and so on) by the computing array 1201 to obtain a third result $N_1$, where the third result $N_1$ is one of the second stage data $N_0$-$N_f$. Then, the second chip C2 computes the first stage data $A_0$-$A_C$ with the fourth part of the weight values (e.g., $W_{03}$ and so on) to obtain a fourth result $N_3$, where the fourth result $N_3$ is one of the second stage data $N_0$-$N_f$. The reason for this sequential mastering is due to the way in which all the chips C1-CN have their input neurons partially localized. It is made possible by the fact that each chip will be calculated with different synapses 4 as well as a target output neuron 3, even when the computed result of each chip is later stored as an output feature value. Furthermore, the first result $N_0$, the third result $N_1$, the second result $N_2$, and the fourth result $N_3$ are sequentially assigned as input data of the second stage data $N_0$-$N_f$.

While all the first stage data $A_0$-$A_c$ have exhausted, all chips C1-CN will store their second stage data $N_0$-$N_f$ in their memories S1-SN. For example, as shown in FIG. 2, the plurality of memories S1-SN of the multichip system 10 include a first memory S1 and a second memory S2. The first memory is connected with the first chip C1, and the second memory S2 is connected with the second chip C2. The first memory S1 includes a first zone Z1 and a second zone Z2, and the second memory S2 includes a third zone Z3 and a fourth zone Z4. The first part of the first stage data $A_0$-$A_2$ is stored in the first zone Z1 of the first memory S1 and the first part of the second stage data $N_0$-$N_1$ is stored in the second zone Z2 of the first memory S1, and the second part of the first stage data $A_3$-$A_5$ is stored in the third zone Z3 of the second memory S2 and the second part of the second stage data $N_2$-$N_3$ is stored in the fourth zone Z4 of the second memory S2.

In the next layer application of the neural network 1, the second stage data $N_0$-$N_f$ stored as output are now for the next layer, and the second stage data $N_0$-$N_f$ serve as input feature values, such that the second stage data $N_0$-$N_f$ stored in their memories S1-SN are switched to be subsequent input feature values of the next layer of the neural network 1. At this time, the first stage data $A_0$-$A_c$ are erased from their memories S1-SN. For example, the first part of the first stage data $A_0$-$A_2$ is erased from first zone Z1 of the first memory S1, and the second part of the first stage data $A_3$-$A_5$ is erased from the third zone Z3 of the second memory S2. Then, the second zone Z2 of the first memory S1 and the fourth zone Z4 of the second memory S2 are converted into input data storage area for storing corresponding second stage data $N_0$-$N_f$, and the first zone Z1 of the first memory S1 and the third zone Z3 of the second memory S2 are converted into output data storage area for storing corresponding third stage data $B_0$-$B_c$.

As shown in FIG. 2, if the second layer L2 is an input layer and the third layer L3 is an output layer of the neural network 1, the neurons 3 serve as input neurons, and the neurons 5 serve as output neurons. One of the chips C1-CN obtains a partial of the second stage data $N_0$-$N_f$ associated with the neurons 3 corresponding to another chips through the broadcasting channel 110. Then, the chips C1-CN calculate the second stage data $N_0$-$N_f$ and generate third stage data $B_0$-$B_c$. The acquisition procedure of the third stage data $B_0$-$B_c$ is similar to the acquisition procedure of the second stage data $N_0$-$N_f$, and will not be described here again.

In the first embodiment, the multichip system 10 does not share actual memory resources. In other words, it is impossible to directly access the local memories S1-SN of the other chips, but it is structured in which each chip shares necessary input feature values (e.g., the first stage data $A_0$-$A_c$ or the second stage data $N_0$-$N_f$) through the common broadcasting channel 110 and uses the necessary parts for calculation. Therefore, the multichip system 10 is possible by the operation mechanism of the present disclosure, which is preferably applied to an application system requiring better performance.

Figure 5:
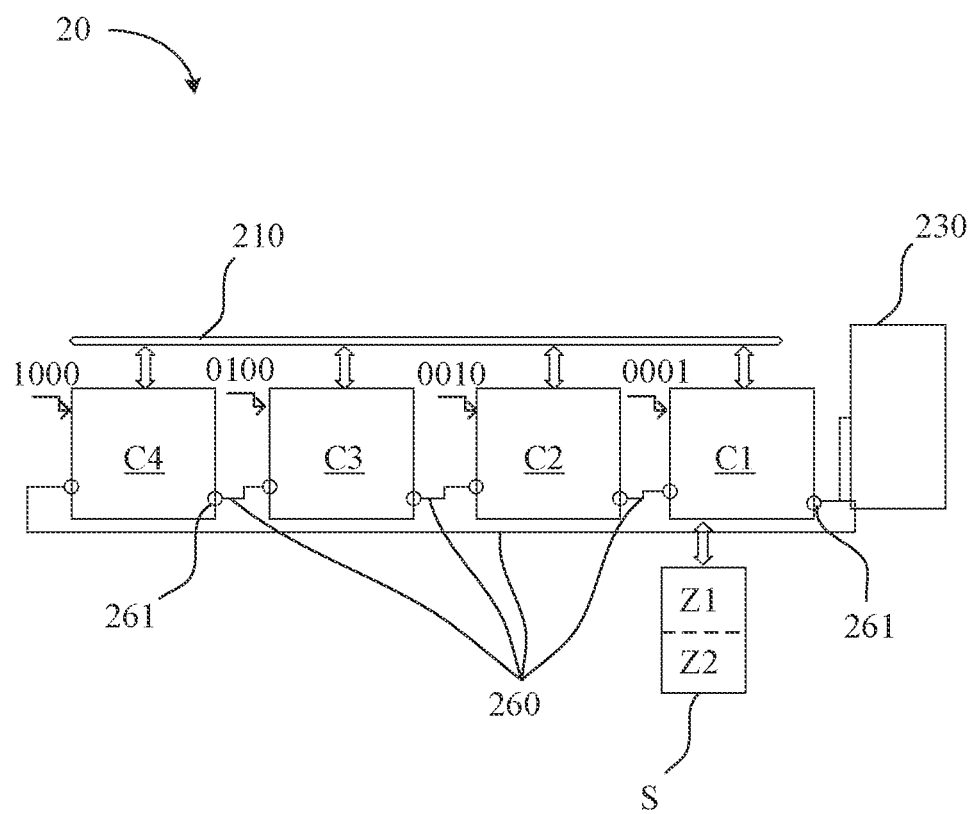
FIG. 5 shows a multichip system according to a second preferred embodiment of the present disclosure.

Referring to FIG. 5, which shows a multichip system 20 according to a second preferred embodiment of the present disclosure. The multichip system 20 includes a broadcasting channel 210, a plurality of chips (such as a first chip C1, a second chip C2, a third chip C3, and a fourth chip C4), a controller 230, and a memory S. The plurality of chips C1-C4 are connected with the broadcasting channel 210. Preferably, the chips C1-C4 may be accelerating chips for using in the neural network. The difference between the first embodiment and the second embodiment is that the multichip system 20 of the second preferred embodiment only includes one memory S. Moreover, the multichip system 20 also includes a plurality of transmitting lines 260 to connect one of the chips C1-C4 with the other.

As shown in FIG. 5, the memory S includes a first zone Z1 and a second zone Z2. When the multichip system 20 is used for implementing a first layer of a neural network application, the first stage data are stored in the first zone Z1 and the second stage data are stored in the second zone Z2.

As shown in FIG. 5, in the second embodiment, in order to prevent the increase in cost due to the large amount of local memory, the memory S can be mounted on only one chip 220 and the memory S can be utilized as a structure shared by many chips C1-C4. In the second embodiment, a separate memory sharing terminal 261 is required. Furthermore, one of the chips extracts a corresponding part of the first stage data associated with input neurons from the memory S through at least one of the transmitting lines 260. Then, the chip sequentially transmits the corresponding part of the first stage data to other chips through the broadcasting channel 210.

In certain embodiments, one or more process steps described herein may be performed by one or more processors (e.g., a computer processor) executing program codes recorded on a non-transitory computer-readable medium. For example, a process of implementing a neuron network application in a multichip system, as shown in FIG. 2 and FIG. 3, may have one or more steps performed by one or more processors executing program codes stored as program instructions in a computer readable storage medium (e.g., a non-transitory computer-readable medium).

Figure 6:
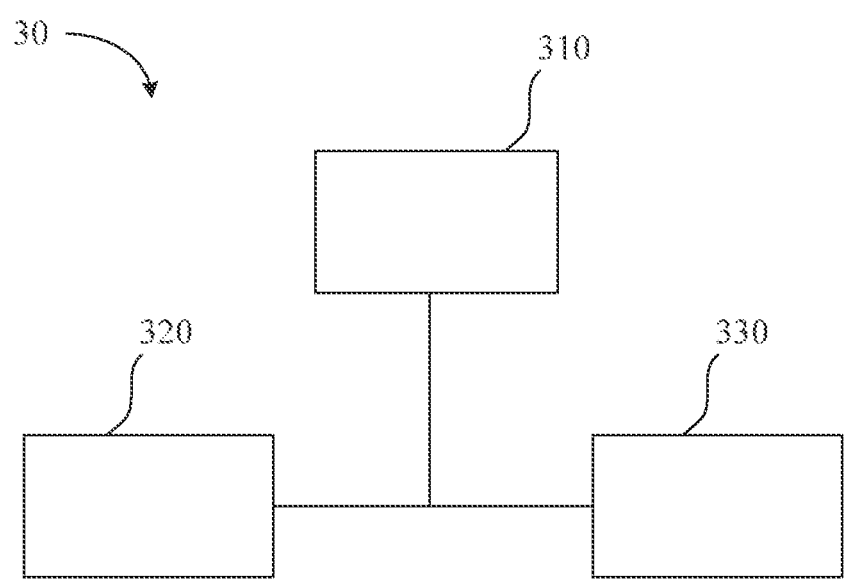
FIG. 6 depicts a block diagram of one embodiment of exemplary computer system 30.

FIG. 6 depicts a block diagram of one embodiment of exemplary computer system 30. The exemplary computer system 30 may be used to implement one or more embodiments described herein. In some embodiments, computer system 30 is operable by a user to implement one or more embodiments described herein such as a process of implementing a neuron network application in a multichip system, as shown in FIG. 2 and FIG. 3. In the embodiment of FIG. 6, the computer system 30 includes a processor 310, a storage medium 320, and various peripheral devices 330. The processor 310 is coupled to the storage medium 320 and the peripheral devices 330. The processor 310 is configured to execute program codes, including the instructions for implementing the neuron network application, which may be in software. For example, as shown in FIG. 2, if the first layer L1 is an input layer and the second layer L2 is an output layer of the neural network 1, program codes being executed by the processor 310 include: program code A, setting-up input neurons 2 and output neurons 3 of the neural network 1, where each of the output neurons 3 is connected to the input neurons 2 via synapses 4 for weighting outputs from the input neurons 2 depending on weight values $W_{00}$, etc.; program code B, waiting first stage data $A_0$-$A_C$ corresponding to the input neurons 2 over a channel 110; program code C, computing partial first stage data $A_0$-$A_C$ with corresponding weight values; program code D, simultaneously computing second stage data $N_0$-$N_f$ corresponding to the output neurons 3; program code E, determining, whether to compute all of the weight values, if yes, proceed to program code F, if not, back to program code B; program code F, keeping the second stage data $N_0$-$N_f$ on a memory; program code G, setting-up the second stage data $N_0$-$N_f$ for the output neurons 3; and program code H, determining, whether all assigned output neurons 3 are completed or not, if yes, switching to a next layer application, if no, calling a new channel task and back to program code A.

Furthermore, when the computer system 30 performs the new channel task, program codes being executed by the processor 310 include: program code I, loading the first stage data $A_0$-$A_C$ form the memory; program code J, broadcasting with the first stage data $A_0$-$A_C$ through the channel 110; program code K, determining, whether the first stage data $A_0$-$A_C$ are completely broadcasted, if yes, proceed to program code L, if not, back to program code J; and program code L, determining, whether to compute all of the first stage data $A_0$-$A_C$, if yes, the new channel task is end, if not, back to program code I.

Furthermore, when the computer system 30 switches to perform the next layer application, program codes being executed by the processor 310 include: program code M, setting-up input points of the memory as output points; and program code N, setting-up output points of the memory into input points. Specifically, as shown in FIG. 2, in the next layer application of the neural network 1, the second stage data $N_0$-$N_f$ stored as output are now for the next layer, and the second stage data $N_0$-$N_f$ serve as subsequent input feature values, such that the second stage data $N_0$-$N_f$ stored in their memories S1-SN are switched to be subsequent input feature values of the next layer of the neural network 1. At this time, the previous input feature values $A_0$-$A_C$ are erased from their memories S1-SN. For example, as shown in FIG. 3, the first part of the first stage data $A_0$-$A_2$ is erased from first zone Z1 of the first memory S1, and the second part of the first stage data $A_3$-$A_5$ is erased from the third zone Z3 of the second memory S2. Then, the second zone Z2 of the first memory S1 and the fourth zone Z4 of the second memory S2 are converted into input data storage area for storing corresponding second stage data $N_0$-$N_f$, and the first zone Z1 of the first memory S1 and the third zone Z3 of the second memory S2 are converted into output data storage area for storing corresponding third stage data $B_0$-$B_c$.

In some embodiments, the computer system 30 may include more than one processor. Moreover, the processor 310 may include one or more processors or one or more processor cores. The processor 310 may be coupled to the storage medium 320 and the peripheral devices 330 in any desired fashion. For example, in some embodiments, the processor 310 may be coupled to the storage medium 320 and/or the peripheral devices 330 via various interconnect. Alternatively or in addition, one or more bridge chips may be used to couple the processor 310, the storage medium 320, and peripheral devices 330. The storage medium 320 may include any type of memory system. For example, the storage medium 320 may include DRAM, and more particularly double data rate (DDR) SDRAM, RDRAM, etc. A memory controller may be included to interface to the storage medium 320, and/or the processor 310 may include a memory controller. The storage medium 320 may store the program codes to be executed by the processor 310 during use, data to be operated upon by the processor during use, etc. The peripheral devices 330 may represent any sort of hardware devices that may be included in the computer system 30 or coupled thereto.

The storage medium 320 may include the program codes one or more program codes representative of multichip system 10 (depicted in FIG. 3) included in an integrated circuit design and one or more code sequences representative of a process of implementing a neuron network application in a multichip system, as shown in FIG. 2 and FIG. 3. Each code sequence may include one or more instructions, which when executed by the processor 310 in the computer system 30, implement the operations described for the corresponding code sequence. Generally speaking, a computer accessible storage medium may include any storage medium 320 accessible by the computer system 30 during use to provide instructions and/or data to the computer system 30. The storage medium 320 may be physically included within the computer system 30 to which the storage medium 320 provides instructions/data. Alternatively, the storage medium 320 may be connected to the computer system 30. For example, the storage medium 320 may be connected to the computer system 30 over a network or wireless link, such as network attached storage. The storage medium 320 may be connected through a peripheral interface such as the universal serial bus (USB). Generally, computer accessible storage medium may store data in a non-transitory manner, where non-transitory in this context may refer to not transmitting the instructions/data on a signal. For example, non-transitory storage may be volatile (and may lose the stored instructions/data in response to a power down) or non-volatile.

In summary, in the present disclosure, the multichip system is capable of parallel operation. In order to improve the performance of a machine learning accelerating chip, the present disclosure provides a broadcasting channel for multichip system function. It is a structural design idea based on the fulfillment of the market demand of the form having the function. In order to realize this, in the present disclosure, the input feature value of each chip is partially transmitted and shared, and it is possible to calculate the troop by using it in other chips at the same time, and the calculated result will be finally output neuron value, and it acts as subsequent input data of the next layer again. This allows us to achieve high performance and low cost system with the multichip system to meet market demands.

The above descriptions are merely preferable embodiments of the present disclosure. Any modification or replacement made by those skilled in the art without departing from the principle of the present disclosure should fall within the protection scope of the present disclosure.

What is claimed is:

1. A data processing method adapted to a multichip system for implementing a neural network application, wherein the multichip system comprises a channel, a first chip and a second chip connecting with the channel, wherein the neural network application comprises a first stage data, a second stage data, a third stage data, and a plurality of weight values, wherein the data processing method comprises:

allocating the first chip to process a first part of the first stage data, a first part of the second stage data, and a first part of the third stage data, and allocating the second chip to process a second part of the first stage data, a second part of the second stage data, and a second part of the third stage data;

acquiring, by the first chip, a first part of the plurality of weight values corresponding the second stage data;

acquiring, by the second chip, a second part of the plurality of weight values corresponding the second stage data;

acquiring, by the first chip, the first part of the first stage data;

transmitting, by the first chip, the first part of the first stage data to the second chip through the channel;

receiving, by the second chip, the first part of the first stage data;

acquiring, by the second chip, the second part of the first stage data;

transmitting, by the second chip, the second part of the first stage data to the first chip through the channel;

receiving, by the first chip, the second part of the first stage data;

computing, by the first chip, the first stage data with the first part of the plurality of weight values to obtain a first result, wherein the first result is one of the second stage data; and computing, by the second chip, the first stage data with the second part of the plurality of weight values to obtain a second result, wherein the second result is one of the second stage data.

2. The data processing method as claimed in claim 1, wherein after obtaining the first result and the second result, the data processing method further comprises:

acquiring, by the first chip, a third part of the plurality of weight values corresponding the second stage data;

acquiring, by the second chip, a fourth part of the plurality of weight values corresponding the second stage data;

acquiring, by the first chip, the first part of the first stage data;

transmitting, by the first chip, the first part of the first stage data to the second chip through the channel;

receiving, by the second chip, the first part of the first stage data;

acquiring, by the second chip, the second part of the first stage data;

transmitting, by the second chip, the second part of the first stage data to the first chip through the channel;

receiving, by the first chip, the second part of the first stage data;

computing, by the first chip, the first stage data with the third part of the plurality of weight values to obtain a third result, wherein the third result is one of the second stage data; and computing, by the second chip, the first stage data with the fourth part of the plurality of weight values to obtain a fourth result, wherein the fourth result is one of the second stage data.

3. The data processing method as claimed in claim 2, wherein after obtaining the first result, the second result, the third result, and the fourth result, the data processing method further comprises: sequentially assigning the first result, the third result, the second result, and the fourth result as input data of the second stage data.

4. The data processing method as claimed in claim 1, wherein the multichip system further comprises a first memory and a second memory, the first memory is connected with the first chip, the second memory is connected with the second chip;

wherein the first memory comprises a first zone and a second zone, and the second memory comprises a third zone and a fourth zone; and wherein the first part of the first stage data is stored in the first zone of the first memory and the first part of the second stage data is stored in the second zone of the first memory, and the second part of the first stage data is stored in the third zone of the second memory and the second part of the second stage data is stored in the fourth zone of the second memory.

5. The data processing method as claimed in claim 4, wherein the data processing method further comprises:

erasing the first part of the first stage data from the first memory and erasing the second part of the first stage data from the second memory; and converting the second zone of the first memory and the fourth zone of the second memory into input data storage area.

6. The data processing method as claimed in claim 1, wherein the multichip system further comprises a memory connected with the first and second chips and a plurality of transmitting lines configured to connect the first and second chips;

wherein the memory comprises a first zone and a second zone; and wherein the first stage data are stored in the first zone of the memory and the second stage data are stored in the second zone of the memory.

7. A multichip system for implementing a neural network application, wherein the neural network application comprises a first stage data, a second stage data, a third stage data, and a plurality of weight values, the multichip system comprises:

a data channel;

a first chip and a second chip connecting with the data channel;

a storage;

a processor, wherein computerized codes of the multichip system are stored in the storage and configured to be executed by the processor to perform a data processing method, the data processing method comprising:

allocating the first chip to process a first part of the first stage data, a first part of the second stage data, and a first part of the third stage data, and allocating the second chip to process a second part of the first stage data, a second part of the second stage data, and a second part of the third stage data;

acquiring, by the first chip, a first part of the plurality of weight values corresponding the second stage data;

acquiring, by the second chip, a second part of the plurality of weight values corresponding the second stage data;

acquiring, by the first chip, the first part of the first stage data;

transmitting, by the first chip, the first part of the first stage data to the second chip through the data channel;

receiving, by the second chip, the first part of the first stage data;

acquiring, by the second chip, the second part of the first stage data;

transmitting, by the second chip, the second part of the first stage data to the first chip through the data channel;

receiving, by the first chip, the second part of the first stage data;

computing, by the first chip, the first stage data with the first part of the plurality of weight values to obtain a first result, wherein the first result is one of the second stage data; and computing, by the second chip, the first stage data with the second part of the plurality of weight values to obtain a second result, wherein the second result is one of the second stage data.

8. The multichip system as claimed in claim 7, wherein the data processing method further comprises:

acquiring, by the first chip, a third part of the plurality of weight values corresponding the second stage data;

acquiring, by the second chip, a fourth part of the plurality of weight values corresponding the second stage data;

acquiring, by the first chip, the first part of the first stage data;

transmitting, by the first chip, the first part of the first stage data to the second chip through the channel;

receiving, by the second chip, the first part of the first stage data;

acquiring, by the second chip, the second part of the first stage data;

transmitting, by the second chip, the second part of the first stage data to the first chip through the channel;

receiving, by the first chip, the second part of the first stage data;

computing, by the first chip, the first stage data with the third part of the plurality of weight values to obtain a third result, wherein the third result is one of the second stage data; and computing, by the second chip, the first stage data with the fourth part of the plurality of weight values to obtain a fourth result, wherein the fourth result is one of the second stage data.

9. The multichip system as claimed in claim 8, wherein the data processing method further comprises: sequentially assigning the first result, the third result, the second result, and the fourth result as input data of the second stage data.

10. The multichip system as claimed in claim 7, wherein the multichip system further comprises a first memory and a second memory, the first memory is connected with the first chip, the second memory is connected with the second chip;

wherein the first memory comprises a first zone and a second zone, and the second memory comprises a third zone and a fourth zone; and wherein the first part of the first stage data is stored in the first zone of the first memory and the first part of the second stage data is stored in the second zone of the first memory, and the second part of the first stage data is stored in the third zone of the second memory and the second part of the second stage data is stored in the fourth zone of the second memory.

11. The multichip system as claimed in claim 10, wherein the data processing method further comprises:

erasing the first part of the first stage data from the first memory and erasing the second part of the first stage data from the second memory; and converting the second zone of the first memory and the fourth zone of the second memory into input data storage area.

12. The multichip system as claimed in claim 7, wherein the multichip system further comprises a memory connected with the first and second chips and a plurality of transmitting lines configured to connect the first and second chips;

wherein the memory comprises a first zone and a second zone;

wherein the first stage data are stored in the first zone of the memory and the second stage data are stored in the second zone of the memory; and wherein each of the first and second chips acquires the first stage data from the memory through at least one of the transmitting lines.

13. A non-transitory computer-readable medium for implementing a neuron network application in a multichip system, the non-transitory computer-readable medium having program codes recorded thereon, the program codes being executed by a processor and comprising:

A, setting-up input neurons and output neurons of the neural network, wherein each of the output neurons is connected to the input neurons via synapses for weighting outputs from the input neurons depending on weight values, wherein the input neurons and the output neurons are allocated to each of a plurality of chips, and each of the chips processes a corresponding part of first stage data associated with some of the input neurons which occupy the respective chips;

B, waiting the first stage data corresponding to the input neurons over a channel, wherein each of the chips sequentially transfers a corresponding part of the first stage data to the other chip;

C, the chips parallelly computing partial first stage data with corresponding weight values;

D, simultaneously computing second stage data corresponding to the output neurons;

E, determining, whether to compute all of the weight values, if yes, proceed to F, if not, back to B;

F, keeping the second stage data on a memory;

G, setting-up the second stage data for the output neurons; and

H, determining, whether all assigned output neurons are completed or not, if yes, switching to a next layer application, if no, calling a new channel task and back to A.

14. The non-transitory computer-readable medium for implementing a neuron network application in a multichip system as claimed in claim 13, wherein the new channel task comprising:

I, loading the first stage data form the memory;

J, broadcasting with the first stage data through the channel;

K, determining, whether the first stage data are completely broadcasted, if yes, proceed to L, if not, back to J; and L, determining, whether to compute all of the first stage data, if yes, the new channel task is end, if not, back to I.

15. The non-transitory computer-readable medium for implementing a neuron network application in a multichip system as claimed in claim 13, wherein the switching of the next layer application comprises:

M, setting-up input points of the memory as output points; and

N, setting-up output points of the memory into input points.

* * * * *